United States Patent [19]

Asakawa

[11] Patent Number: 4,994,967
[45] Date of Patent: Feb. 19, 1991

[54] INFORMATION RETRIEVAL SYSTEM WITH MEANS FOR ANALYZING UNDEFINED WORDS IN A NATURAL LANGUAGE INQUIRY

[75] Inventor: Satoshi Asakawa, Yokohama, Japan
[73] Assignee: Hitachi, Ltd., Tokyo, Japan
[21] Appl. No.: 295,758
[22] Filed: Jan. 11, 1989

[30] Foreign Application Priority Data

Jan. 12, 1988 [JP] Japan ................... 63-5073

[51] Int. Cl.⁵ .............................. G06F 15/38
[52] U.S. Cl. ................... 364/419; 364/200; 364/274.8; 364/900; 364/963
[58] Field of Search .......................... 364/419

[56] References Cited

U.S. PATENT DOCUMENTS

| | | | |
|---|---|---|---|
| 4,661,924 | 4/1987 | Okamoto et al. | 364/419 X |
| 4,674,066 | 6/1987 | Kucera | 364/419 X |
| 4,703,425 | 10/1987 | Muraki | 364/419 |
| 4,777,617 | 10/1988 | Frisch et al. | 364/419 X |
| 4,814,988 | 3/1989 | Shiotani et al. | 364/419 |
| 4,837,689 | 6/1989 | Tanaka et al. | 364/419 |
| 4,849,898 | 7/1989 | Adi | 364/419 |
| 4,942,526 | 7/1990 | Okajima et al. | 364/419 |

Primary Examiner—Jerry Smith
Assistant Examiner—Steven G. Kibby
Attorney, Agent, or Firm—Antonelli, Terry, Stout & Kraus

[57] ABSTRACT

An information retrieval system is adapted to carry out information retrieval by entering an inquiry sentence in natural language, executing semantic analysis of the natural language inquiry sentence by a semantic analysis unit, and producing a retrieval condition from a result of the semantic analysis. The information retrieval system is provided in its semantic analysis unit with an undefined word processing unit which classifies an undefined word in the inquiry sentence in accordance with a process of producing a retrieval condition from the semantic analysis of other words contained in the inquiry sentence, the undefined word being defined as a word unregistered in a dictionary provided therein and incapable of direct semantic analysis, and displays a result of processing for the undefined word classified. The undefined word processing permits operation of information retrieval to be done without discontinuation.

5 Claims, 4 Drawing Sheets

| ACCOMPANYING WORD | GRAMMATICAL RULES |
|---|---|
| CALLED | HAVE THE SAME ATTRIBUTE AS A WORD SUBSEQUENT THERETO |
| IS NOT | HAVE THE SAME ATTRIBUTE AS A WORD SUBSEQUENT THERETO |
| FROM | HAVE THE SAME ATTRIBUTE AS A WORD ACCOMPANYING "TO" |
| | |
| | |

FIG.5

Q1 : WHO IS PERSON WHO WORKS FOR A COMPANY CALLED HITACHI ?

Q2 : PLEASE TELL ME ABOUT A CONCERT TO BE HELD ON SEPTEMBER 12 ?

Q3 : WHAT IS POPULATION OF YOKOHAMA ?

FIG.6

M1 : "HITACHI" IS DECIDED AS A COMPANY NAME.

M2 : A RETRIEVAL CONDITION WAS PREPARED AFTER REMOVAL "TO BE HELD.

M3 : NO RETIEVAL CONDITION CAN BE PREPARED BECAUSE THE MEANING OF "POPULATION" CANNOT BE UNDERSTOOD. PLEASE REGISTER IT IN THIS DICTIONARY OR REPLACE IT WITH ANOTHER EXPRESSION.

INFORMATION RETRIEVAL SYSTEM WITH MEANS FOR ANALYZING UNDEFINED WORDS IN A NATURAL LANGUAGE INQUIRY

BACKGROUND OF THE INVENTION

The present invention relates to an information retrieval system and, more particularly, to an information retrieval system adapted to perform an information retrieval by inputting an inquiry sentence in natural language, executing a semantic analysis of the natural language inquiry sentence by a semantic analysis unit, and producing retrieval conditions from a result of the semantic analysis.

As data base technology and artificial intelligence technology develop, there have been growing demands for an information retrieval system which may be used by users inexperienced in computers, as well as skilled operators. A system has been developed as one example in compliance with such demands, which may make an inquiry in natural language with a computer. Such an information retrieval system is provided with a semantic analysis unit for processing natural language, which unit is designed so as to understand the semantics of an inquiry sentence inputted in a natural language, produce retrieval conditions, and carry out an information retrieval. In order for the semantic analysis unit of the system to understand the semantics of words contained in the inquiry sentence, it is required to collate a word with a dictionary and carry out a semantic analysis. It is to be noted, however, that it is impossible to register in a dictionary all words which might be contained in a great variety of inquiry sentences so that a portion of words are not capable of being collated, such as an undefined word, whereby the system cannot understand the inquiry sentence.

A natural language processing technology including a semantic analysis is the type of technology provided for a machine translation system. In the machine translation system, various techniques are used for processing undefined words for which it cannot carry out a semantic analysis if there is an undefined word. For example, Japanese Laid-Open Patent Application (kokai) No. 60-181,973 discloses a system for recognizing undefined words, which system is designed to investigate a grammatical relationship of an undefined word with a word located before and after the undefined word and recognize a grammatical attribute of the undefined word.

It is noted, however, that conventional undefined word processing technology relates in almost all cases to machine translation systems which are designed to recognize a grammatical attribute, for example, from a word before and after an undefined word, a suffix, a prefix or the like. Such a system for recognizing a grammatical attribute of an undefined word from a grammatical relationship of the undefined word with a word therebefore or thereafter suffers from the disadvantage that, if there is an undefined word that cannot be recognized as a result of investigation of its grammatical relationship, recognition processing of such a grammatical relationship cannot be continued, leading to inability to analyze the semantics of a sentence.

As have been described hereinabove, in a semantic analysis for a machine translation system, on the one hand, a semantic analysis often becomes stalemated and a continuation of the processing becomes very difficult or hardly possible if there is an undefined word that is unrecognizable with respect to its attribute from the grammatical relationship. In a semantic analysis in an information retrieval system, on the other hand, there are many cases in which no continuation of the processing can be blocked in processing of retrieval conditions for undefined words even if there would be an undefined word whose meaning cannot be recognized from its grammatical relationship, when a semantic analysis of an inquiry in natural language is carried out. Even in this case, however, conventional information retrieval systems suffer from the disadvantage that the presence of an undefined word leads to suspension of continuation of the processing with a semantic analysis being disabled as in the case of a semantic analysis in the machine translation system.

SUMMARY OF THE INVENTION

Therefore, the present invention has an object to provide an information retrieval system adapted to enter an inquiry sentence in natural language, which is designed so as to continue processing in an appropriate manner even if there would be an undefined word for a semantic analysis in the inquiry sentence input in natural language.

In order to achieve the above object, the present invention consists of an information retrieval system adapted to carry out an information retrieval by inputting an inquiry sentence in natural language, executing a semantic analysis of the natural language sentence by a semantic analysis unit, and producing retrieval conditions from the result of the semantic analysis. The semantic analysis unit is provided with an undefined word processing means which operates to classify, among words contained in the inquiry sentence in natural language, an undefined word whose semantic analysis is not possible because it is unregistered in a dictionary, the classifying being performed in accordance with a process for producing a retrieval condition from a semantic analysis of the other words in the inquiry sentence. The message based on the result of processing the undefined word which has been classified.

The undefined word processing means in the semantic analysis unit of the information retrieval system is designed such that, if the inquiry sentence input in natural language contains an undefined word that is not registered in the dictionary and is not amenable to semantic analysis, the undefined word is classified in accordance with a process of producing a retrieval condition from the semantic analysis of the other words in the inquiry sentence and a result of classification is displayed as a result of processing the undefined word. Accordingly, if an undefined word is contained in an inquiry sentence, the information retrieval system can continue the processing by classifying the undefined word in accordance with a process of producing the retrieval condition from the semantic analysis of the other words in the inquiry sentence and by displaying a message based on the result of processing the undefined word which has been classified. Thus, the information retrieval system can be operated efficiently as demanded by a user and operation of inputting desired demands can be performed readily.

This system further allows an undefined word to be processed in an appropriate manner without treating the undefined word indiscriminately as a proper noun. A display of a message based on the result of processing by the system serves the user by confirming that his operation complies with a user's demand, thus improving the reliability of the information retrieval.

Other objects and features of the present invention will become apparent in the course of the following description of the preferred embodiments in conjunction with drawings attached hereto.

BRIEF DESCRIPTION OF THE DRAWINGS

FIG. 5 is a table showing one example of an inquiry sentence in natural language to be input into the information retrieval system according to the embodiments of the present invention.

FIG. 6 is a table showing one example of output messages from the system for the input inquiry sentence.

DETAILED DESCRIPTION OF THE PREFERRED EMBODIMENTS

Figure 1:
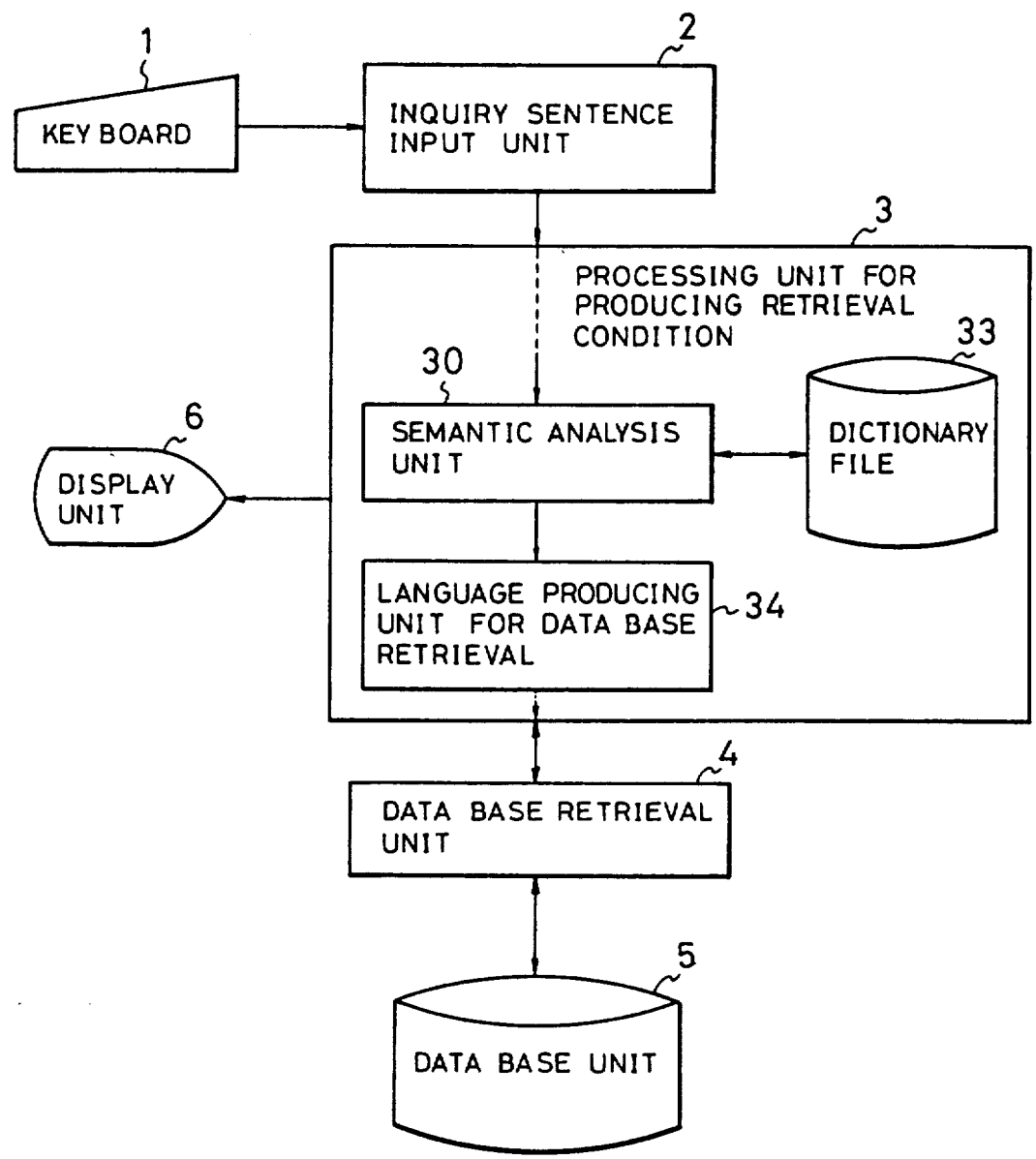
FIG. 1 is a block diagram showing a structure of an information retrieval system as a preferred embodiment according to the present invention.

As shown in FIG. 1, which is the block diagram showing the structure of the information retrieval system as one preferred embodiment according to the present invention, reference numeral 1 indicates a keyboard, reference numeral 2 indicates an inquiry sentence input unit, reference numeral 3 indicates a processing unit for producing a retrieval condition, reference numeral 4 indicates a data base retrieval unit, reference numeral 5 indicates a data base unit, reference numeral 6 indicates a display unit, reference numeral 30 indicates a semantic analysis unit, reference numeral 33 for a dictionary file, and reference numeral 34 indicates a language producing unit for data base retrieval. The processing unit 3 for producing a retrieval condition is provided with the semantic analysis unit 30 containing the dictionary file 33, and the language producing unit 34 for data base retrieval. The semantic analysis unit 30 is designed to collate an undefined word with a dictionary for processing the undefined word and to implement a semantic analysis of an inquiry sentence in natural language.

In executing an information retrieval using the information retrieval system as described, a user enters an inquiry sentence in natural language for information it requires using the keyboard 1. The inquiry sentence is then applied through the inquiry sentence input unit 2 to the processing unit 3 for producing retrieval conditions where the semantic analysis unit 30 is operated to execute the processing necessary for a comprehensive semantic analysis for the inquiry sentence input in natural language, such as a syntax analysis, a collation with a dictionary, an analysis of a word meaning and the like, to effect a semantic analysis of the sentence, to output a word for a retrieval condition necessary for an information retrieval, and to provide an output to the language producing unit 34 for data base retrieval. The language producing unit 34 then produces a language for data base retrieval from the given word for a retrieval condition and applies the corresponding language to the data base retrieval unit 4 which in turn accesses the data base unit 5 from the language producing unit for data base retrieval 34 with respect to the given retrieval condition fetching information complying with the retrieval condition and displaying the corresponding information retrieved on the display unit 6 through the processing unit 3 for producing retrieval conditions.

Figures 2, 3:
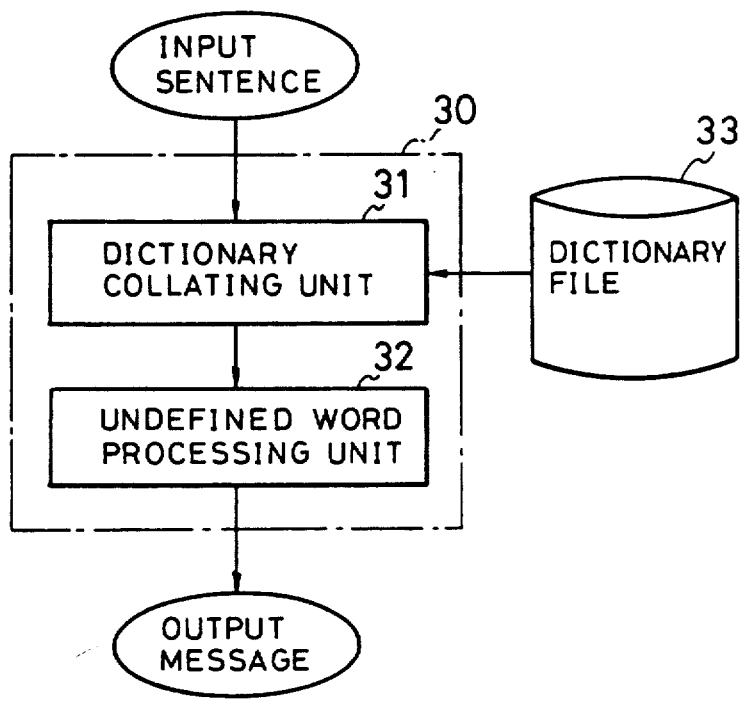
FIG. 2 is a block diagram showing a structure of the essential portion of a semantic analysis unit.
FIG. 3 is a table showing one example accommodating a grammatical rule for defining an attribute of undefined words and accompanying words.

FIG. 2 is the block diagram showing the structure of the the essential portion of the semantic analysis unit 30 of FIG. 1. As shown in FIG. 2, reference numeral 31 indicates a dictionary collating unit, and reference numeral 32 indicates an undefined word processing unit. The dictionary collating unit 31 is designed to collate each of the words in an inquiry sentence input in natural language with words registered in the dictionary file 33. The undefined word processing unit 32 is designed to process an undefined word corresponding to a word that can not be collated by the processing in the dictionary collating unit 31 because of no registration of the word in the dictionary file 33.

The following is a description of the operation of the semantic analysis unit 30. As an inquiry sentence is inputted in natural language, the input sentence enters in the dictionary collating unit 31 where words in the input sentence are collated with words registered in the dictionary file 33 to search for the meaning of the words and the like and to recognize the words. If a word is not registered in the dictionary file 33 and cannot be collated as a defined word, then the dictionary collating unit 31 gives an instruction to the undefined word processing unit 32 for processing the undefined word.

The undefined word processing unit 32 then determines the kind of undefined word, refers the undefined word to a result obtained by executing a semantic analysis of the other words input in the inquiry sentence, classifies it in accordance with a process of producing a retrieval condition for the inquiry sentence, executes necessary processing for the undefined word, and provides a result of processing as an output message. The output message from the undefined word processing unit 32 is displayed on the display unit 6 for presentation to the user.

Figure 4:
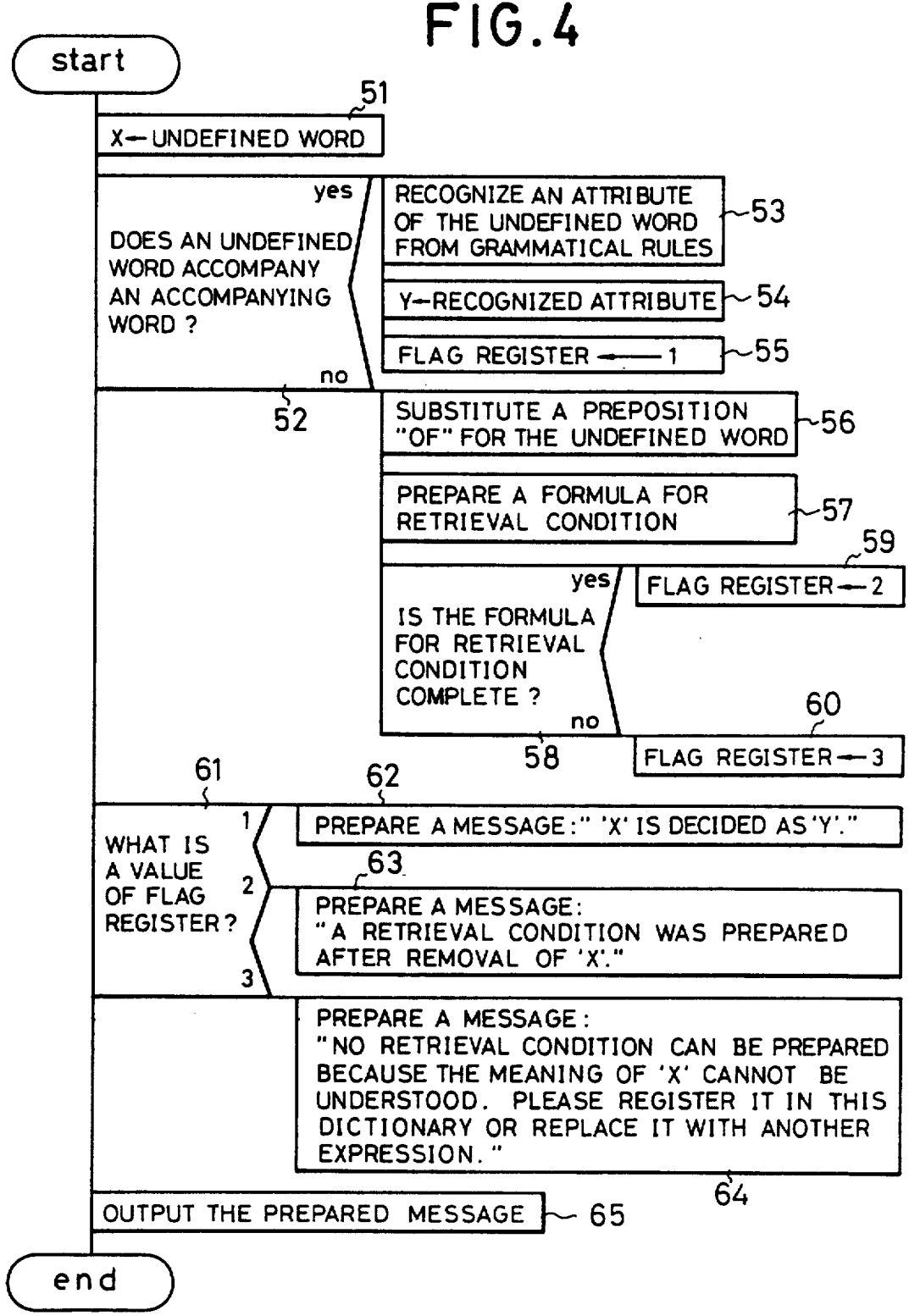
FIG. 4 is a problem analysis diagram (PAD) showing operation of processing by an undefined words processing unit.

FIG. 3 shows one example of a table for accompanying words accompanied by an undefined word, which accommodates grammatical rules for defining attributes of the undefined word and the accompanying word to be used for the undefined word processing. FIG. 4 is the PAD diagram showing a processing operation of the undefined word processing unit 32. The undefined word processing will be described with reference to FIG. 4. In the undefined word processing, an undefined word is set at variable X in a process box 51 and whether the undefined word accompanies an accompanying word before or after it is decided in a decision box 52. If it is decided in the decision box 52, on the one hand, that there is an accompanying word before or after the undefined word, in a process box 53 an attribute of the undefined word is recognized by means of grammatical rules from the accompanying word accompanied by the undefined word. This processing is performed, for example, as shown in FIG. 3, by finding an applicable grammatical rule from the table of accompanying words which defines grammatical rules for accompanying words and then by recognizing the attribute of the undefined word from the corresponding grammatical rules. As the attribute of the undefined word is recognized, the flow proceeds to a process box 54 where the attribute of the undefined word is set at variable Y. The flow then advances to a process box 55 where a FLAG register is set at 1.

If it is decided in the decision box 52, on the other hand, that no accompaning word is present with the undefined word, then the flow proceeds to a process box 56 where the undefined word is removed and a preposition "of", for example, is substituted therefor in order to connect words before and after the undefined word to each other with such a preposition "of". Then the flow proceeds to a process box 57 where, since there is no undefined word any more in the inquiry sentence by the processing in the process box 56, a formula for a retrieval condition is formed from a new inquiry sentence produced by combining the other words which have already been subjected to a semantic analysis by means of a dictionary collation. Then, in a decision box 58, it is decided whether a formula for a retrieval condition is produced in the process of producing the retrieval condition after removal of the undefined word. If it is decided that a retrieval condition formula is produced, on the one hand, the flow proceeds to a process box 59 where the FLAG register is set at 2. If it is decided that no retrieval condition formula is produced, on the other hand, the flow proceeds to a process box 60 where the FLAG register is set at 3. As described hereinabove, the FLAG register is set at 1, 2 or 3 in accordance with the retrieval condition formulas from a semantic analysis for the words in the inquiry sentence other than the undefined word.

Then the flow proceeds to a decision box 61 where the value set at the FLAG register is determined and the processing in the process boxes 62, 63 or 64 is executed in accordance with the values, 1, 2 or 3, set at the FLAG register, respectively, producing an output message for each process box. The output message is then given in a process box 65. More specifically, if the value set at the FLAG register is "1", the process box 62 gives an output message reading as follows: "X is decided as Y." If the value set at the FLAG register is "2", the process box 63 gives an output message stating that "A retrieval condition is prepared after removal of "X"." Furthermore, if the value set in the FLAG register is "3", the process box 64 gives an output message stating that "No retrieval condition can be prepared because the meaning of "X" cannot be understood. Please register it in this dictionary or replace it with another expression." Such output messages are given in the process box 65 finishing the processing of the undefined word.

The undefined word processing in the information retrieval system as described hereinabove will be described specifically. FIG. 5 is one example of various inquiry sentences in natural language to be input in the information retieval system according to the preferred embodiment of the present invention. FIG. 6 is one example of output messages given from the system for the input inquiry sentences. The output messages M1, M2, and M3 shown in FIG. 6 are examples for the input inquiry sentences Q1, Q2, and Q3 shown in FIG. 5, respectively.

Assume that a word "Hitachi" is an undefined word in the inquiry sentence Q1 asking "Who is a person who works for a company called Hitachi?". In this case, it is decided that, as the undefined word "Hitachi" accompanies a word "called ", then the undefined word processing is executed by searching a table for accompanying words as shown in FIG. 3, further searching an attribute of a word "company" coming prior to the accompanying word and having an indentical attribute from a grammatical rule for the word "called" accompanied by the undefined word "Hitachi", and deciding from a grammatical analogy that the attribute of the undefined word is a company name. In order to give such a decision result to an output message, the the above-analogized attribute "company name" is set at variable Y at a process box 54, the FLAG register is set at 1 at a process box 55, and an output message produced by the value 1 of the FLAG register reads at a process box 62 as follows: " "Hitachi" (X: undefined word) is decided as a company name (Y)".

As a result, the undefined word processing provides an output message M1 stating that "'Hitachi' is decided as 'a company name'." for the inquiry sentence Q1 asking "Who is a person who works for a company called Hitachi?".

Assume that the inquiry sentence Q2 is a sentence stating "Please tell me about a concert to be held on September 12?" and an undefined word is "to be held". In this case, the undefined word accompanies no accompanying word so that an attribute of the undefined word cannot be analogized from an accompanying word and its grammatical rule in such a manner as in the undefined word processing for the inquiry sentence Q1. In this case, the flow proceeds to a process box 56 where the undefined word "to be held" is removed and a preposition "of" is substituted therefor in order to connect a word prior to the undefined word to a word subsequent thereto. Thus at a process box 57, a semantic analysis is performed for a new inquiry sentence Q2 modified to state "Please tell me about a concert of September 12?" and a formula for a retrieval condition is produced. Such a processed result is given as an output message so that the FLAG register is set at 2 at a process box 59. At a process box 63, the output message to be produced by the value 2 set at the FLAG register is output as the output message M2 reading as follows: "A retrieval condition was prepared after removal of "to be held" (X: undefined word)."

In the inquiry sentence Q3 asking "What is a population of Yokohama?", it is assumed that the word "population" is an undefined word. In this case, neither the undefined word processing applied to the inquiry sentence Q1 where an attribute is analogized from an accompanying word and its grammatical rule nor the undefined word processing applied to the inquiry sentence Q2 where a retrieval condition is produced by removing an undefined word can be applied to the inquiry sentence. In this case, a user is requested to alter the undefined word so that the FLAG register is set at 3 at a process box 60 and the flow proceeds to a process box 64 where the output message produced by the value 3 of the FLAG register is output to read as follows: "No retrieval condition can be prepared because the meaning of "population" (X: undefined word) cannot be understood. Please register it in this dictionary or replace it with another expression."

As a result, in the undefined word processing in this case, no retrieval condition can be produced for the inquiry sentence Q3 stating "What is a population of Yokohama?" and the output message M3 is output reading as follows: "No retrieval condition can be prepared because the meaning of "population" cannot be understood. Please register it in this dictionary or replace it with another expression."

As described hereinabove, in the undefined word processing for the information retrieval system according to the embodiments, undefined words are processed by classifying three types of undefined words, the first one being of the type in which an attribute of an undefined word can be grammatically defined by the system corresponding to a process for producing retrieval conditions from a semantic analysis of the other words in an inquiry sentence, the second one being of the type in which, even if the undefined word is removed, it can work as a retrieval condition, and the third one being of the type in which a retrieval condition cannot be produced without registering it in a dictionary or replacing it with another expression. The results of processing each of the undefined words as classified are displayed as an output message so as to be confirmed by a user.

Accordingly, in the information retrieval system in which an information retrieval is carried out for an inquiry sentence input in natural language, the system is designed so as to continue the processing by classifying an undefined word in accordance with a process of producing retrieval conditions from a semantic analysis of other words in the inquiry sentence even if an undefined word is contained in the inquiry sentence in natural language and displaying a result of processing, thus operating the information retrieval system efficiently and as requested by a user.

The present invention has specifically been described as hereinabove by way of examples, but it is to be understood that the present invention is not limited to the above embodiments and is interpreted as encompassing variations and modifications within the scope of the invention without departing from the spirit thereof.

As have been described hereinabove, the present invention is directed to the information retrieval system for performing an information retrieval by entering an inquiry sentence in natural language, which permits operation of an information retrieval without discontinuation by means of the undefined word processing, because an undefined word, that has not been registered in a dictionary and could not be collated therewith, is classified in accordance with a process of producing retrieval conditions and a result of processing in the undefined word by the system is displayed. Such operation of processing the system is provided to a user for recognition so that the information retrieval system according to the present invention is extremely effective in readily entering an inquiry sentence in natural language as the user requires.

What is claimed is:

1. In an information retrieval system adapted to perform information retrieval in response to an inquiry sentence inputted in natural language, by carrying out a semantic analysis of the natural language inquiry sentence by means of a semantic analysis unit, and by producing a retrieval condition from a result of said semantic analysis, the improvement comprising:
    undefined word processing means for classifying an undefined word in the inputted inquiry sentence in accordance with a process of producing a retrieval condition from a semantic analysis of another word in the inquiry sentence, said undefined word being a word unregistered in a dictionary and incapable of direct semantic analysis; and
    display processing means for displaying a message based on a result of classifying the undefined word by said undefined word processing means.

2. An information retrieval system adapted to perform information retrieval in response to an inquiry sentence inputted in natural language, by carrying out semantic analysis of the natural language inquiry sentence by means of a semantic analysis unit, and by producing a retrieval condition from a result of said semantic analysis, comprising:
    an input unit for inputting an inquiry sentence in a natural language;
    a semantic analysis unit for carrying out a semantic analysis of the inquiry sentence;
    an undefined word processing unit for classifying an undefined word in the inputted inquiry sentence in accordance with a process of producing a retrieval condition from a semantic analysis of another word in the inquiry sentence, said undefined word being incapable of direct semantic analysis; and
    display processing means for displaying a message based on a result of classifying the undefined word by said undefined word processing unit.

3. An information retrieval system as claimed in claim 2, wherein the semantic analysis unit contains a dictionary and means for carrying out a semantic analysis in conjunction with the dictionary to define a word unregistered in the dictionary, and wherein the undefined word processing unit operates to process the undefined word.

4. An information retrieval system adapted to perform information retrieval in response to an inquiry sentence inputted in natural language, by carrying out semantic analysis of the natural language inquiry sentence by means of a semantic analysis unit, and by producing a retrieval condition from a result of said semantic analysis, comprising:
    an input unit for inputting an inquiry sentence in natural language;
    a semantic analysis unit for carrying out a semantic analysis of the inquiry sentence;
    an undefined word processing unit for classifying an undefined word in the inputted inquiry sentence in accordance with a process of producing a retrieval condition from a semantic analysis of another word in the inquiry sentence, said undefined word being incapable of direct semantic analysis;
    display processing means for producing a message based on a result of classifying the undefined word by said undefined word processing unit;
    a data base unit for storing information to be retrieved;
    a data base retrieving unit for retrieving data from said data base unit in response to the retrieval condition produced by said undefined word processing unit; and
    a display unit for displaying a result of processing by said display processing means and a result of retrieval by said data base retrieving unit.

5. A method for processing an undefined word in an information retrieval system adapted to perform information retrieval in response to an inquiry sentence inputted in natural language, by carrying out a semantic analysis of the natural language inquiry sentence by means of a semantic analysis unit, and by producing a retrieval condition from a result of said semantic analysis, comprising:
    an input step of inputting the inquiry sentence in natural language;
    a semantic analysis step of carrying out a semantic analysis of the inquiry sentence;
    a step of classifying an undefined word in the inputted inquiry sentence in accordance with a process of producing a retrieval condition from a semantic analysis of another word in the inquiry sentence, said undefined word being a word unregistered in a dictionary and incapable of semantic analysis; and
    a step of displaying a message based on a result of classifying the undefined word.

* * * * *